(12) United States Patent
Nelson et al.

(10) Patent No.: US 10,284,130 B2
(45) Date of Patent: May 7, 2019

(54) PSC MOTOR HAVING MULTIPLE SPEED AND VOLTAGE CONFIGURATIONS

(71) Applicant: Regal Beloit America, Inc., Beloit, WI (US)

(72) Inventors: Andrea Lena Nelson, Fort Wayne, IN (US); Lester Benjamin Manz, Paulding, OH (US); Bryan James Stout, Fort Wayne, IN (US); Harry Robert Wilson, Auburn, IN (US); Aurelio Santiago Garrido, Tamaulipas (MX); Juan Manuel Amaya Martinez, Tamaulipas (MX); Fredier Ruiz Arias, Tamaulipas (MX)

(73) Assignee: Regal Beloit America, Inc., Beloit, WI (US)

( * ) Notice: Subject to any disclaimer, the term of this patent is extended or adjusted under 35 U.S.C. 154(b) by 14 days.

(21) Appl. No.: 15/457,604

(22) Filed: Mar. 13, 2017

(65) Prior Publication Data
US 2018/0262147 A1   Sep. 13, 2018

(51) Int. Cl.
| | |
|---|---|
| *H02P 25/18* | (2006.01) |
| *H02P 1/44* | (2006.01) |
| *F24F 7/013* | (2006.01) |
| *F24F 11/77* | (2018.01) |
| *F24F 11/88* | (2018.01) |
| *H02P 25/26* | (2006.01) |
| *H02P 25/04* | (2006.01) |

(52) U.S. Cl.
CPC ............. *H02P 25/18* (2013.01); *F24F 11/77* (2018.01); *F24F 11/88* (2018.01); *H02P 1/44* (2013.01); *H02P 25/04* (2013.01); *H02P 25/26* (2013.01)

(58) Field of Classification Search
CPC . H02P 23/0072; G01N 30/8624; G01R 17/02; G05D 3/16; H02K 26/00
USPC .......................................................... 318/748
See application file for complete search history.

(56) References Cited

U.S. PATENT DOCUMENTS

| | | | | |
|---|---|---|---|---|
| 5,345,126 A | * | 9/1994 | Bunch ..................... | H02K 17/08 310/68 C |
| 6,227,822 B1 | * | 5/2001 | Chen ........................ | F04D 25/08 310/63 |
| 6,864,659 B2 | | 3/2005 | Ratz et al. | |
| 7,746,025 B2 | | 6/2010 | Choi et al. | |
| 2003/0030408 A1 | * | 2/2003 | Ratz ........................ | F23N 1/062 318/772 |

(Continued)

*Primary Examiner* — Kawing Chan
*Assistant Examiner* — Bradley R Brown
(74) *Attorney, Agent, or Firm* — Armstrong Teasdale LLP

(57) ABSTRACT

A permanent split capacitor (PSC) motor includes a stator defining an axis of rotation and a rotor disposed adjacent the stator. The stator includes a start winding, a capacitor electrically coupled in series with the start winding, a first plurality of windings, and a second plurality of windings. At least one winding of the first plurality of windings is energized in parallel with at least one winding of the second plurality of windings at a first voltage and in series with the at least one winding of the second plurality of windings at a second voltage. The first and second pluralities of windings are energized to produce a plurality of motor speeds. The rotor rotates relative to the stator about the axis of rotation at a selected one of the plurality of motor speeds induced at least partially by a magnetic output of the windings of the stator.

20 Claims, 8 Drawing Sheets

(56) References Cited

U.S. PATENT DOCUMENTS

| | | | | |
|---|---|---|---|---|
| 2006/0181238 A1* | 8/2006 | Choi | ................... | H02P 25/04 |
| | | | | 318/786 |
| 2011/0254477 A1* | 10/2011 | Woodward | ............. | F23N 3/082 |
| | | | | 318/400.3 |
| 2014/0265985 A1* | 9/2014 | Bonner, Jr. | ............... | H02P 5/00 |
| | | | | 318/494 |

* cited by examiner

*700

| 208-230V | 115V |
|---|---|
| CAP To CAPACITOR | CAP To CAPACITOR |
| LINE 1 To MA & CAPACITOR | LINE 1 To MA & CB & CAPACITOR |
| CC To C1 - HIGH SPEED | CA To C1 & C5 - HIGH SPEED |
| C6 - MEDIUM SPEED | C2 To C3 & C6 - MEDIUM SPEED |
| C4 - LOW SPEED | C4 & C7 - LOW SPEED |
| CA To CB | CD To CC |
| C2 To C5 | |
| C3 To C7 | |
| INSULATE CD | |

CCW SHOWN TO REVERSE SWITCH ORANGE AND YELLOW LEADS

ORANGE
BROWN
PURPLE
YELLOW

ORANGE
BROWN
PURPLE
YELLOW

PSC MOTOR HAVING MULTIPLE SPEED AND VOLTAGE CONFIGURATIONS

BACKGROUND

The field of the disclosure relates generally to permanent split capacitor (PSC) motors, and more specifically, PSC motors with multiple speed and voltage configurations.

PSC motors are induction-based motors that include a plurality of windings and a capacitor for inducing a phase shift between windings, thereby increasing torque of a rotor. PSC motors are used in various systems, such as heating, ventilation, and air conditioning (HVAC) systems. For example, a PSC motor may be used to drive a blower in an exemplary HVAC system.

However, at least some PSC motors have limited operating flexibility. That is, at least some PSC motors are limited to a single operating voltage and/or motor speed to prevent imbalanced performance and to limit the complexity of the motor. For example, some PSC motors are limited to a single motor speed because adding additional motor speeds to the motors may have reduced performance, particularly at lower speed settings, relative to the first motor speed.

Due to the limited operating flexibility, multiple configurations of a PSC motor for different operating voltages and/or motor speeds are manufactured. To prevent limited inventory of high-demand configurations and excessive inventory of low-demand configurations, the manufacturer monitors sales and stock levels and manufactures particular configurations based on the observations, which may increase manufacturing costs, increase inventory of low-demand configurations, and otherwise overcomplicate the manufacturing of the PSC motors.

Moreover, during installation of the motor, a technician determines the requirements of the system into which the motor is to be installed and selects a motor configuration that meets the requirements. If the technician does not have the correct motor configuration in the field, the technician may be required to travel to pick up the motor or order a new motor, which increases the time and cost of the installation.

BRIEF DESCRIPTION

In one aspect, a permanent split capacitor (PSC) motor includes a stator defining an axis of rotation and a rotor disposed adjacent the stator. The stator includes a start winding, a capacitor electrically coupled in series with the start winding, a first plurality of windings, and a second plurality of windings electrically coupled to the first plurality of windings. At least one winding of the first plurality of windings is energized in parallel with at least one winding of the second plurality of windings at a first voltage and is energized in series with the at least one winding of the second plurality of windings at a second voltage. The first and second pluralities of windings are energized to produce a plurality of motor speeds. The rotor rotates relative to the stator about the axis of rotation at a selected one of the plurality of motor speeds induced at least partially by a magnetic output of the start winding, the first plurality of windings, and the second plurality of windings.

In another aspect, a PSC motor includes a stator defining an axis of rotation and a rotor disposed adjacent the stator. The stator includes a start winding, a capacitor electrically coupled in series with the start winding, a plurality of main windings electrically coupled to the start winding and the capacitor, and a first plurality of extended main windings. The plurality of main windings includes a first center terminal and the first plurality of extended main windings includes a second center terminal. The plurality of main windings and the first plurality of extended main windings are energized at one of a first voltage and a second voltage to produce a first motor speed and a second motor speed. The rotor rotates relative to the stator about the axis of rotation at a selected one of the first motor speed and the second motor speed induced at least partially by a magnetic output of the start winding, the plurality of main windings, and the first plurality of extended main windings.

In yet another aspect, a heating, ventilation, and air conditioning (HVAC) system includes an air blower and a PSC motor coupled to the air blower. The PSC motor includes a stator defining an axis of rotation and a rotor disposed adjacent the stator. The stator includes a start winding, a capacitor electrically coupled in series with the start winding, a plurality of main windings electrically coupled to the start winding and the capacitor, and a first plurality of extended main windings. The plurality of main windings includes a first center terminal and the first plurality of extended main windings includes a second center terminal. The plurality of main windings and the first plurality of extended main windings energized at one of a first voltage and a second voltage to produce a first motor speed and a second motor speed. The rotor rotates relative to the stator about the axis of rotation at a selected one of the first motor speed and the second motor speed induced at least partially by a magnetic output of the start winding, the plurality of main windings, and the first plurality of extended main windings.

BRIEF DESCRIPTION OF THE DRAWINGS

FIG. 7 is an exemplary installation guide that may be included with the PSC motor shown in FIG. 2.

DETAILED DESCRIPTION

Systems and methods described herein are directed to permanent split capacitor (PSC) motors, and more particularly, PSC motors having a plurality of voltage and speed configurations. PSC motors described herein may be used, for example, in heating, ventilation, and air conditioning (HVAC) systems or other motor-based systems. In the exemplary embodiment, the PSC motor includes a stator, a capacitor, a rotor disposed adjacent the stator, and a wiring interface. The stator includes a start winding, a set of main windings electrically coupled in parallel to the start winding, and two extended sets of main windings. The capacitor is electrically coupled in series with the start winding to induce a phase shift between a magnetic output of the start winding and a magnetic output of the set of main windings, thereby generating sufficient torque at the rotor to cause the rotor to rotate. The set of main windings includes a first winding and a second winding electrically coupled to each other via a center terminal. The set of main windings and the extended set of main windings are configured to be energized to produce three motor speeds (e.g., high, medium, and low speeds).

The wiring interface includes a plurality of wiring leads coupled to the start, main, and extended main windings. The wiring interface includes at least one wiring lead that is coupled to the center terminal of the set of main windings. The wiring leads include one or more identifiers to facilitate identification of a corresponding terminal of the windings. The wiring leads are removably coupled to a control circuit that drives or powers the stator. The wiring interface is configured to be coupled to the control circuit in a plurality of wiring configurations. Each wiring configuration is associated with an operating voltage and the three motor speeds. In the example embodiment, the wiring interface has two wiring configurations such that the PSC motor is a dual voltage, three-speed PSC motor. The wiring interface is configured to enable installers with limited knowledge of the motor to configure the motor for a particular motor speed and/or operating voltage with relative ease. That is, the wiring interface enables the installers to configure the motor without opening the interior of the motor and manually rewiring the internal components (i.e., the windings). In at least some embodiments, the motor also includes an installation guide (e.g., a sticker, a label, etc.) that provides instructions how to couple the PSC motor to the control circuit for each wiring configuration to reduce the complexity of installing the motor.

Figure 1:
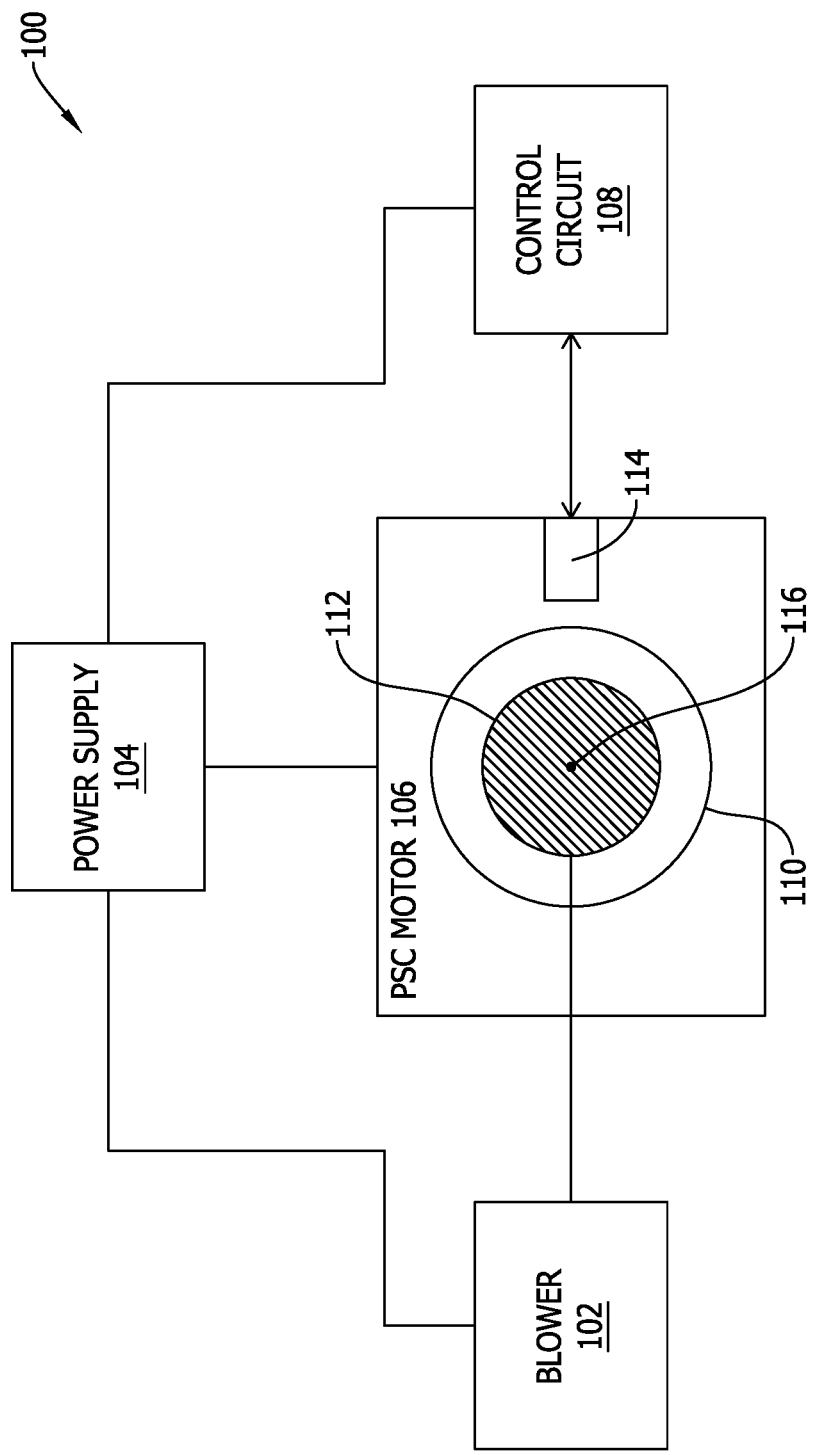
FIG. 1 is an exemplary heating, ventilation, and air conditioning (HVAC) system with a permanent split capacitor (PSC) motor.

FIG. 1 is a schematic diagram of an exemplary HVAC system 100. HVAC system 100 includes a blower 102, a power supply 104, a PSC motor 106, and a control circuit 108. In other embodiments, system 100 includes additional, fewer, or alternative components, including those described elsewhere herein.

Blower 102 is configured to circulate air within an area associated with system 100 to regulate an ambient temperature of the area. That is, air is drawn into blower 102 (e.g., using a fan) and is forced into the area to increase, maintain, or decrease the ambient temperature of the area. Additionally or alternatively, system 100 may include other components from regulating ambient temperature, including, but not limited to, additional blowers 102, compressors, passive cooling systems, and the like.

Power supply 104 is electrically coupled to at least one of blower 102, motor 106, and control circuit 108 to provide electrical power to system 100. In some embodiments, power supply 104 is a power storage device (e.g., a battery). In other embodiments, power supply 104 is coupled to a power grid to receive and condition power from the grid. In certain embodiments, power supply 104 is coupled to control circuit 108 to enable control 108 to selectively provide power to blower 102 and/or motor 106. In such embodiments, power supply 104 may be integrated with control circuit 108.

Motor 106 is coupled to blower 102, power supply 104, and control circuit 108. Motor 106 is configured to operate blower 102. In particular, blower 102 operates in response to a mechanical output (i.e., rotation) of motor 106. For example, a fan of blower 102 may be configured to rotate in response the mechanical output of motor 106. In some embodiments, motor 106 is a single phase motor. In other embodiments, motor 106 is a three phase motor. Alternatively, motor 106 may be configured for a different number of phases.

Motor 106 includes a stator 110, a rotor 112, and a wiring interface 114. In the exemplary embodiment, stator 110 defines an axis of rotation 116. Rotor 112 is disposed adjacent stator 110 and is configured to rotate relative to stator 110 about axis of rotation 116. More specifically, stator 110 includes a plurality of windings (not shown in FIG. 1) that generate, in response to electrical power received from power supply 104 or control circuit 108, a magnetic output. The rotation of rotor 112 is induced by the magnetic output of stator 110. Varying the magnetic output of stator 110 causes rotor 112 to rotate at different motor speeds, thereby enabling different selectable motor speeds. In at least some embodiments, rotor 112 is configured to rotate in two directions (clockwise and counter-clockwise) based on the polarity of the magnetic output of stator 110.

Wiring interface 114 is coupled to the windings for stator 110 and is configured to be removably coupled to control circuit 108. Control circuit 108 is configured to control the operation of motor 106 by selectively driving stator 110 via wiring interface 114. Wiring interface 114 includes one or more wiring leads that are coupled to a respective wiring interface (neither shown in FIG. 1) of control circuit 108. The wiring leads are electrical connection points, and may include, but are not limited to, wire leads, wire harnesses, pin terminals, terminal blocks, and the like.

In the exemplary embodiment, wiring interface 114 is selectively coupled to control circuit 108 in at least two different wiring configurations. Each wiring configuration is associated with an operating voltage of motor 106. When wiring interface 114 is coupled to control circuit 108 in a first wiring configuration, control circuit 108 is configured to energize stator 110 at a first voltage associated with the first wiring configuration. Similarly, when wiring interface 114 is coupled to control circuit 108 in a second wiring configuration, control circuit 108 is configured to energize stator 110 at a second voltage associated with the second wiring configuration. For example, the first voltage may be between, and including, 105V and 125V. The second voltage may be between, and including, 200V and 235V. In other embodiments, stator 110 may be configured to be energized at different operating voltages. The multiple operating voltages enable motor 106 to operate in systems 100 that have different voltage requirements. For example, some countries have different voltage requirements for their respective utility grids.

In the exemplary embodiment, motor 106 is configured to facilitate improved installation within system 100 and reducing parts stock. That is, providing a single motor 106 that is configurable to operate at multiple speeds and voltages enables a field installation of motor 106 without stocking multiple motors having only one voltage or speed configuration. Wiring interface 114 is configured to enable an installer to install motor 106 without requiring detailed knowledge of the internal wiring of motor 106. For example, wiring interface 114 may include diagrams and other identifiers that instruct the installer on the wiring configuration for a particular operating voltage.

Figure 2:
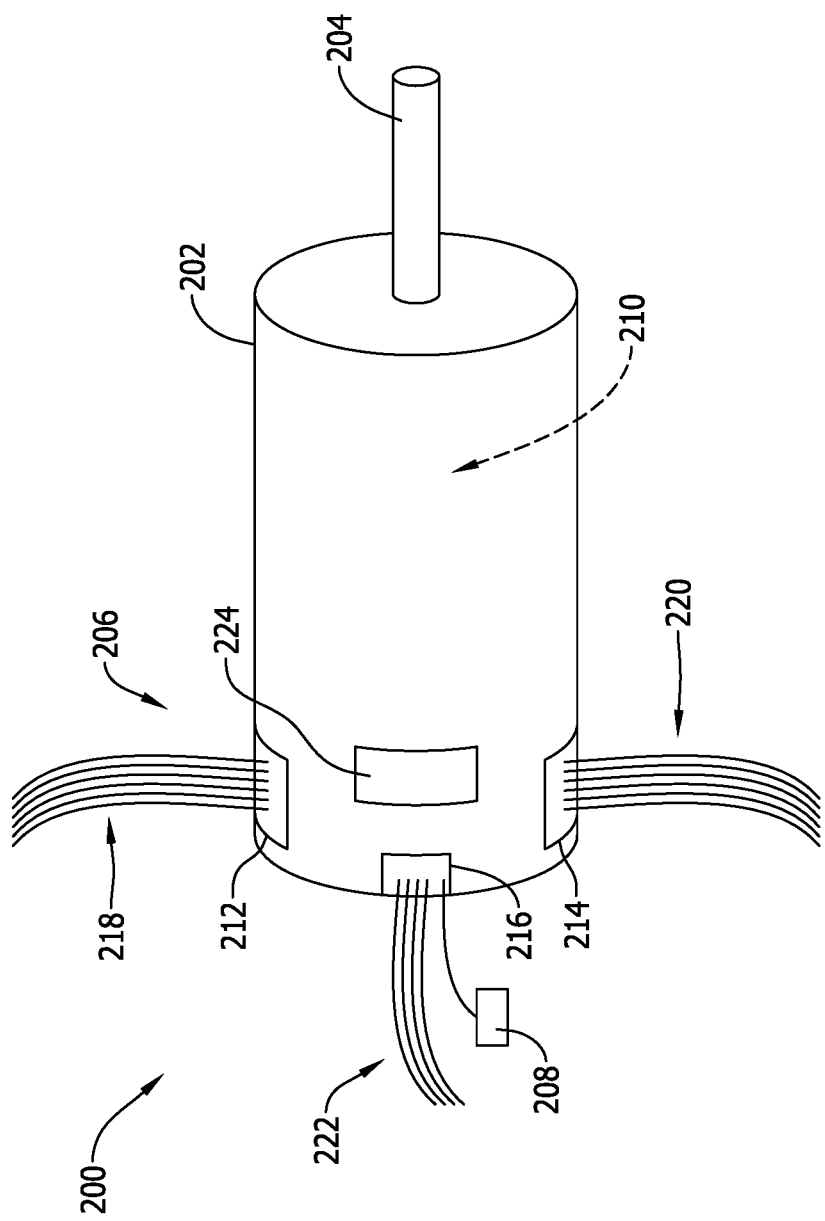
FIG. 2 is an exemplary PSC motor for use in the system shown in FIG. 1.

FIG. 2 is a diagram of an exemplary PSC motor 200 that may be used with system 100 (shown in FIG. 1). PSC motor 200 includes a housing 202, a shaft 204, a wiring interface 206, and a capacitor 208. In other embodiments, motor 200 includes additional, fewer, or alternative components, including those described elsewhere herein.

Housing 202 defines an internal chamber 210. A stator and a rotor (not shown in FIG. 2) of motor 200 are at least partially disposed within chamber 210 to protect the stator and rotor from environmental damage (e.g., dust and water) and reduce motor noise. Shaft 204 is coupled to the rotor and is configured to rotate with the rotor. In at least some embodiments, shaft 204 is coupled to an external device (e.g., air blower 102, shown in FIG. 1) to transfer the mechanical output of motor 200 to the external device.

Wiring interface 206 includes a plurality of wiring leads that extend externally from housing 202. In the exemplary embodiment, wiring interface 206 is divided into different subsets of wiring leads. Each subset of wiring leads is associated with a particular feature or operating parameter of motor 200 to enable an installer to install the motor in different configurations with relative ease. Each wiring lead includes one or more identifiers, such as colors, labels, tactile identifiers to facilitate distinction between the wiring leads. Housing 202 defines a lead exit or opening for each subset of wiring leads to extend from chamber 210 to external of housing 202. In the exemplary embodiment, housing 202 defines a first lead exit 212, a second lead exit 214, and a third lead exit 216. In some embodiments, lead exits 212, 214, 216 are positioned at different locations on housing 202 to facilitate the features described herein. First lead exit 212 is associated with a first subset of wiring leads 218, second lead exit 214 is associated with a second subset of wiring leads 220, and third lead exit 216 is associated with a third subset of wiring leads 222. In other embodiments, housing 202 includes a different number of lead exits. Additionally or alternatively, wiring interface 206 may include additional or fewer subsets of wiring leads.

First subset 218 is associated with a first wiring configuration. The first wiring configuration is associated with a first operating voltage. That is, when motor 200 is coupled to a control circuit using the first wiring configuration, motor 200 is configured to be energized at the first operating voltage. Similarly, second subset 220 is associated with a second wiring configuration and a second operating voltage different from the first operating voltage. Lead exits 212 and 214 are spaced from each other on housing 202 to enable the installer to differentiate between first and second subsets 218, 220. Third subset 222 includes wiring leads associated with both the first and second wiring configuration. In the exemplary embodiment, third subset 222 includes wiring leads for capacitor 208, common main voltage, and rotation terminals. Capacitor 208 is positioned external housing 202. In other embodiments, capacitor is disposed within housing 202. Capacitor 208 is coupled to a wiring lead associated with a common main or line voltage of motor 200 that provides power to the stator. The rotation terminals as described herein are configured via third subset 222 in a clockwise configuration or a counter-clockwise configuration. When the stator is energized, the rotor and shaft 204 is configured to rotate in a clockwise direction or a counter-clockwise direction based on the configuration of the rotation terminals.

In the exemplary embodiment, wiring interface 206 includes seventeen leads. In at least some embodiments, four or five wiring leads are associated with the first motor speed, three or four wiring leads are associated with the second motor speed, three or four wiring leads are associated with the third motor speed, and at least one wiring lead is associated with capacitor 208 and the common main voltage. The remaining four leads are associated with the rotation terminals. In some embodiments, the rotor and shaft 204 are configured to be unidirectional (i.e., rotate only clockwise or counter-clockwise). In such embodiments, wiring interface 206 may include only thirteen wiring leads. Alternatively, the plurality of wiring leads may include a different number of wiring leads suitable to facilitate motor 200 to function as described herein. In some embodiments, the wiring leads of wiring interface 206 have an insulation layer having a reduced radial height to facilitate extending first, second, and third subsets 218, 220, 222 through lead exits 212, 214, 216. In one example, the wiring leads have an insulation layer having a radial height less than $\frac{1}{16}$ inches.

In the exemplary embodiment, housing 202 includes an installation guide 224. Guide 224 is configured to provide visual instructions to an installer to couple wiring interface 206 in one or more wiring configurations. The wiring leads identifiers are provided in the instructions on guide 224. During installation of motor 200, an installer determines the requirements at an install site (e.g., the operating voltage). The installer then refers to guide 224 to properly install motor 200 according to the determined requirements. In other embodiments, guide 224 may be separate from housing 202 (e.g., a booklet or manual for motor 200).

Figure 3:
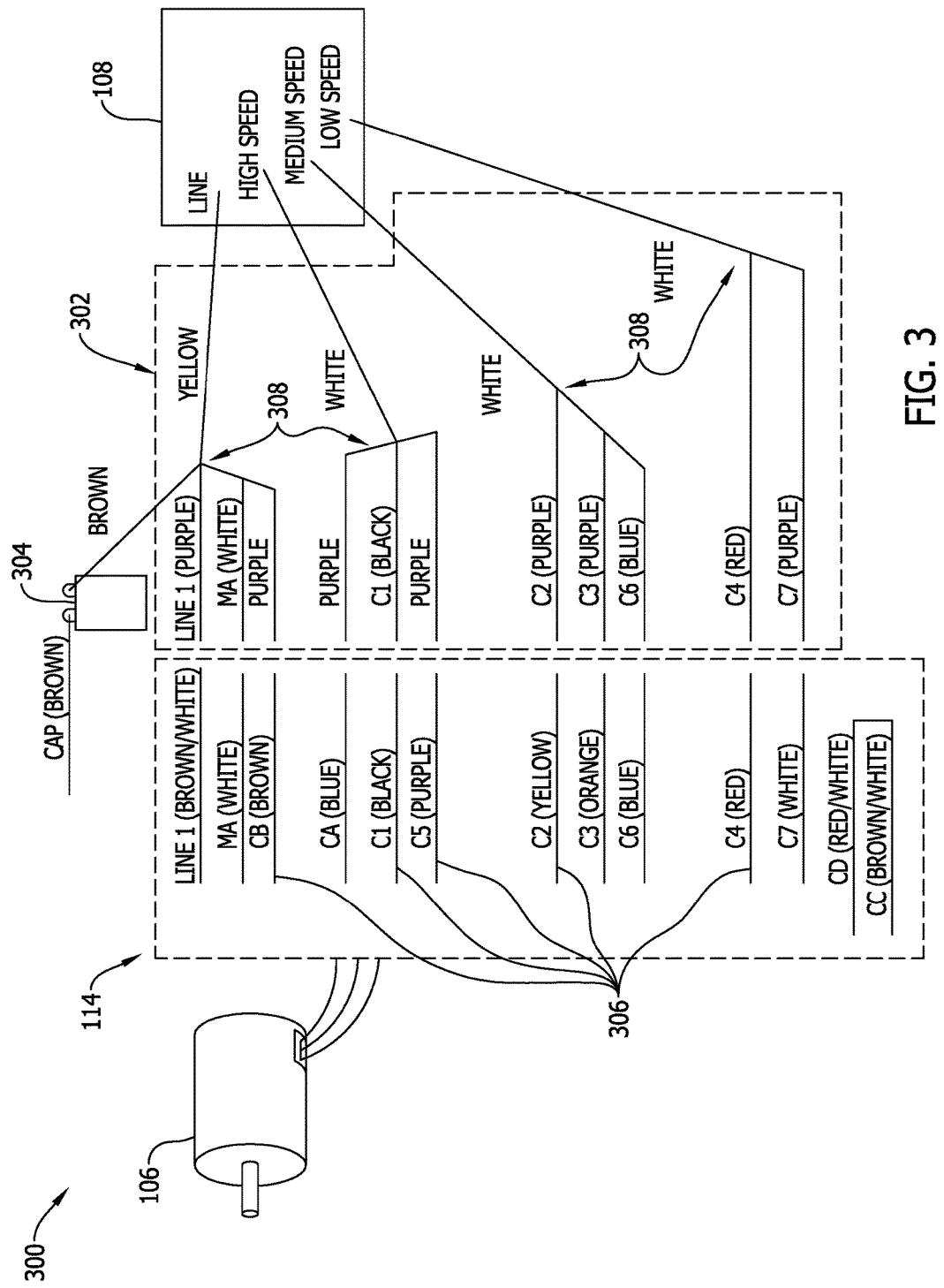
FIG. 3 is an exemplary wiring schematic of a PSC motor for a first wiring configuration for use in the system shown in FIG. 1.
Figure 4:
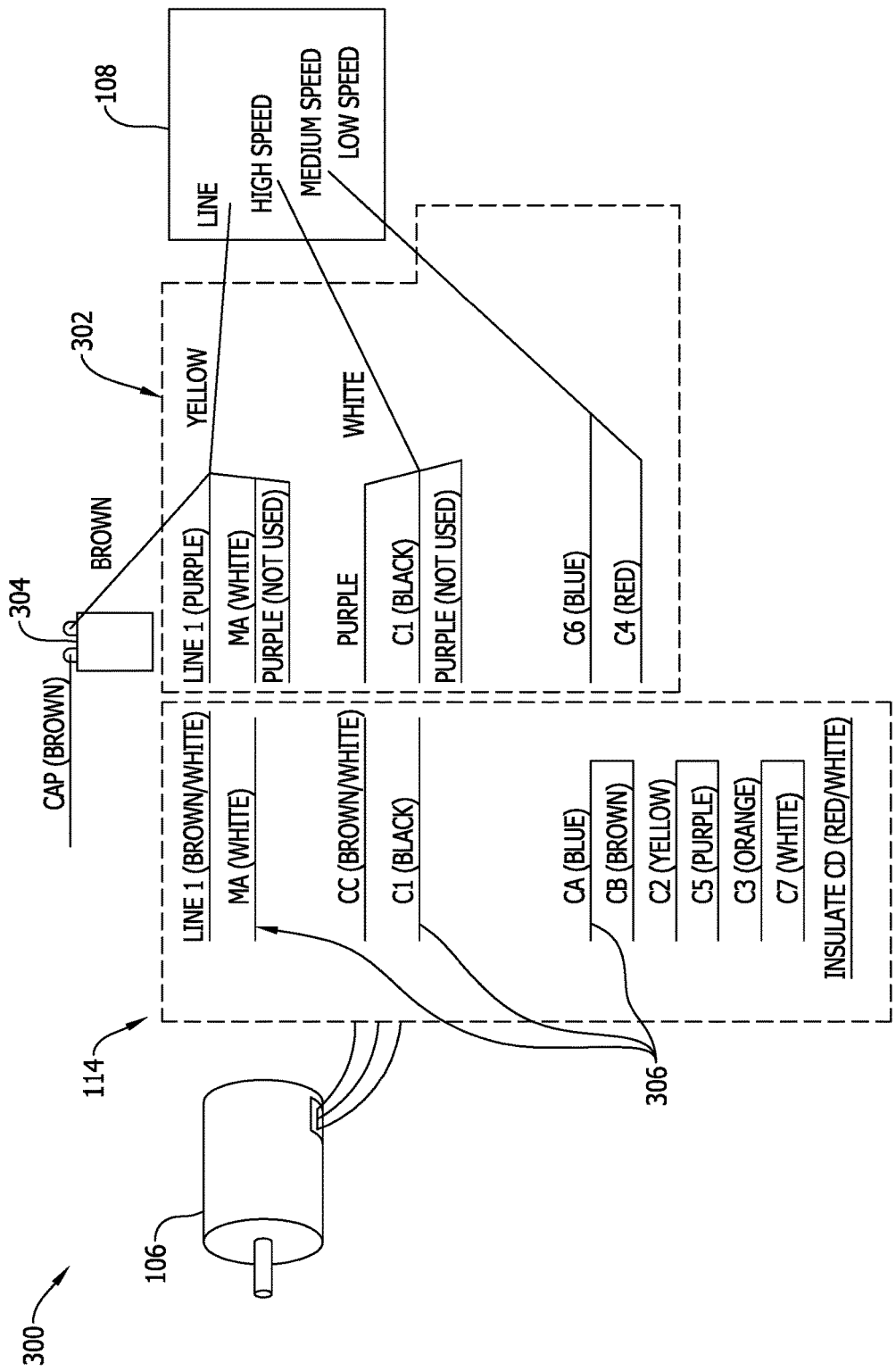
FIG. 4 is an exemplary wiring schematic of a PSC motor for a second wiring configuration for use in the system shown in FIG. 1.
Figure 5:
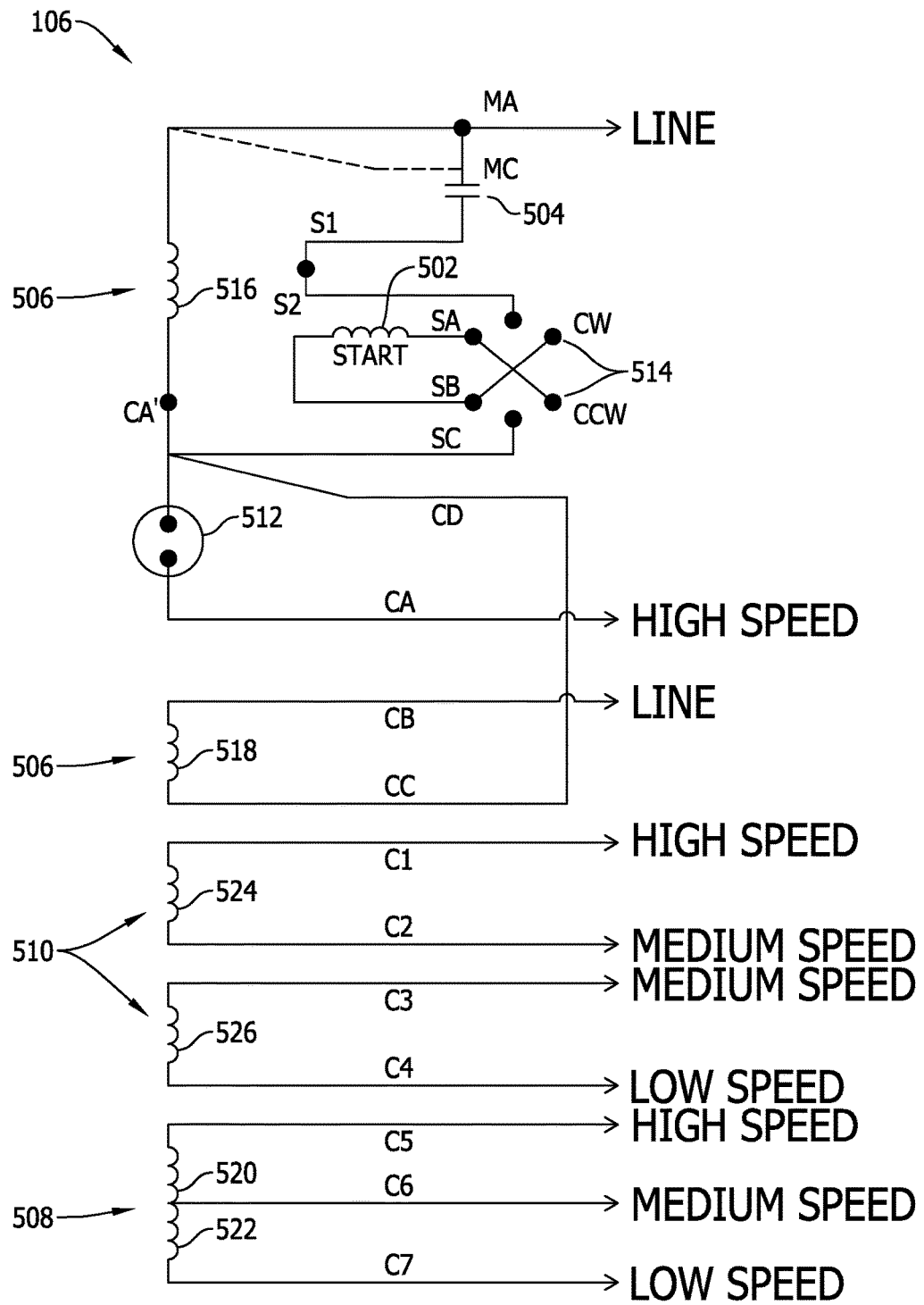
FIG. 5 is an exemplary circuit diagram of the PSC motor in the first wiring configuration shown in FIG. 3.
Figure 6:
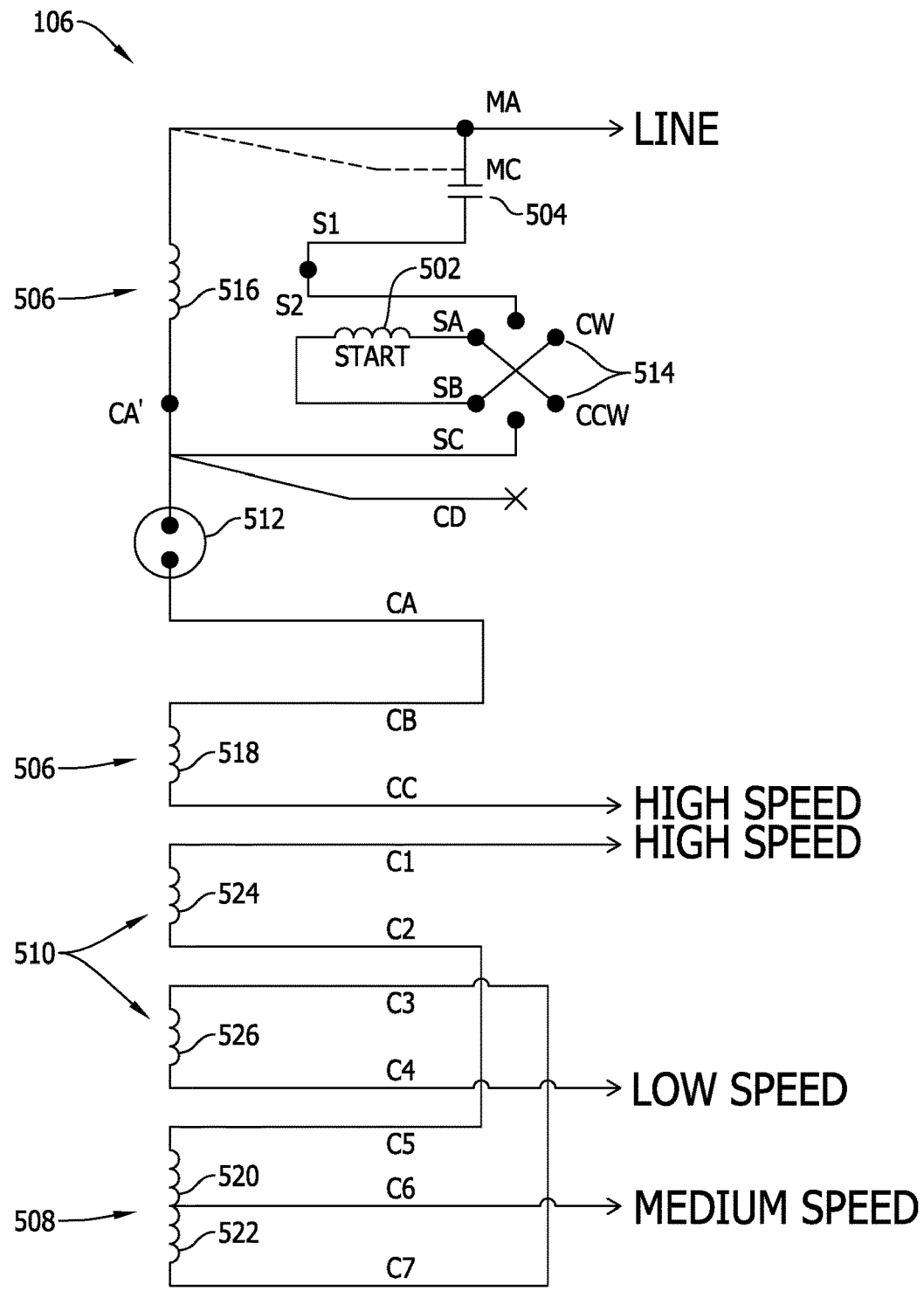
FIG. 6 is an exemplary circuit diagram of the PSC motor in the second wiring configuration shown in FIG. 4.

FIGS. 3-6 are exemplary wiring and circuit diagrams of various wiring configurations that may be used with system 100 to provide a dual-voltage, three-speed PSC motor 106. More specifically, FIG. 3 is a schematic diagram of an exemplary first wiring configuration 300 associated with an operating voltage of 115V, FIG. 4 is a schematic diagram of an exemplary second wiring configuration 400 associated with an operating voltage of 208-230V, FIG. 5 is a circuit diagram of motor 106 when the first wiring configuration is used, and FIG. 6 is a circuit diagram of motor 106 when the second wiring configuration is used. In other embodiments, system 100 may have different wiring or circuit configurations. For example, system 100 may be configured for different operating voltages or different motor speed configurations.

With respect to FIGS. 3 and 4, wiring interface 114 of motor 106 is coupled to a wiring interface 302 of control circuit 108. Wiring interfaces 114, 302 are coupled to a capacitor 304 of motor 106. In the exemplary embodiment, wiring interface 114 includes a plurality of wiring leads 306. Wiring leads 306 extend from stator 110 (shown in FIG. 1). Each wiring lead 306 is coupled to a respective terminal of motor 106 (not shown in FIGS. 3 and 4). When wiring interface 114 is coupled to wiring interface 302, at least some wiring leads 306 may remain unconnected from wiring interface 302 to function as described herein. For example, in FIG. 3, some leads 306 are coupled to each other and one node ("CD") is insulated to prevent electrical connection to said node.

In the exemplary embodiment, leads 306 include one or more identifiers to facilitate locating a particular lead 306. The identifiers may include, but are not limited to, color identifiers, labels (e.g., "CA", "CB", "C1" as shown in FIGS. 3 and 4), and tactile identifiers. In at least some embodiments, at least some wiring leads 306 are physically coupled together in one or more wiring harnesses, terminal blocks, and the like. In such embodiments, the wiring harness may be associated with a particular motor speed or a particular operating voltage such that an installer may readily identify the correct leads 306 to couple to wiring interface 302 of control circuit 108.

In the exemplary embodiment, wiring interface 302 includes a plurality of wire harnesses 308 that couple to wiring leads 306. In some embodiments, wiring interface 302 includes a different configuration of coupling elements to electrically couple control circuit 108 to wiring interface 114. In the exemplary embodiment, each harness 308 is associated with a particular feature of motor 106. For example, one harness 308 is associated with the line voltage of motor 106 ("LINE") and is coupled to capacitor 304. Other harnesses 308 are associated with a specific motor speed (e.g., "HIGH SPEED", "MEDIUM SPEED", or "LOW SPEED") and/or a specific operating voltage.

FIGS. 5 and 6 illustrate the internal wiring of the first and second wiring configurations shown in FIGS. 3 and 4, respectively. That is, FIG. 5 shows stator 110 (shown in FIG. 1) coupled to control circuit 108 in the first wiring configuration associated with an 115V operating voltage. Similarly, FIG. 6 shows stator 110 coupled to control circuit 108 (shown in FIG. 1) in the second wiring configuration associated with a 208-230V operating voltage. In other embodiments, motor 106 may be configured for different operating voltages and may have different wiring configurations.

In the exemplary embodiment, stator 110 includes a start winding 502, a start capacitor 504, a set of main windings 506, a first extended set of main windings 508, a second extended set of main windings 510, and a protector 512. Set of main windings 506 and extended set of main windings 508, 510 are sometimes herein referred to as "main winding 506," "first extended main winding 508," and "second extended main winding 510," but it is to be understood that main winding 506 and extended main windings 508, 510 may include any number of windings suitable to function as described herein. Start winding 502, set of main windings 506, and extended sets of main windings 508, 510 are configured to generate a magnetic output when energized. Start winding 502 is electrically coupled in series with capacitor 504. At least one winding of main windings 506 is coupled in parallel to start winding 502 and capacitor 504. Capacitor 504 is configured to induce a phase lag between start winding 502 and main windings 506 when stator 110 is energized, thereby creating sufficient torque at rotor 112 to cause rotor 112 to rotate. Unlike some induction motors, capacitor 504 remains electrically coupled to main windings 506 after rotor 112 has reached a motor speed set by control circuit 108. In the exemplary embodiment, start winding 502 is coupled to a pair of rotation terminals 514. Each rotation terminal 514 is associated with one or more wiring leads 306 (shown in FIG. 3). Rotation terminals 514 are coupleable to capacitor 504 and main winding 506 in a clockwise configuration or a counter-clockwise configuration. The magnetic output of stator 110 causes rotor 112 to rotate clockwise or counter-clockwise based on the configuration of rotation terminals 514.

Motor 106 includes a plurality of terminals MA, MC, CA, CB, CC, CD, C1, C2, C3, C4, C5, C6, and C7 coupled to start winding 502, capacitor 504, main windings 506, and extended main windings 508, 510. The terminals are configured to be coupled to one or more wiring leads 306 of wiring interface 114 (both shown in FIGS. 3 and 4). In at least some embodiments, each terminal has a respective wiring lead 306 that includes one or more identifiers (e.g., color, label, etc.) associated with the terminal for identify which terminals to wire for each wiring configuration. In certain embodiments, the terminals may be coupled to a wiring lead 306 for each wiring configuration.

Main windings 506 and extended main windings 508, 510 include at least a first set of windings and a second set of windings. Each winding of the first set is electrically coupled to at least one winding of the second set. In one example, each set of main and extended main windings 506, 508, 510 includes a winding from each of the first and second sets of windings. In another embodiment, first extended set of main windings 508 includes one or more windings of the first set of windings and second extended set of main windings 510 includes one or more windings of the second set of windings. Based on the wiring configuration, the first set of windings is configured to be energized in series or in parallel with the second set of windings. In the exemplary embodiment, the first and second sets of windings are energized in parallel at a first operating voltage (e.g., 115V) and are energized in series at a second operating voltage (e.g., 208-230V).

In the exemplary embodiment, set of main windings 506 includes a first winding 516 and a second winding 518. First winding 516 is electrically coupled in parallel to start winding 502 and capacitor 504. In some embodiments, first winding 516 has the same number of turns and inductance as second winding 518. In other embodiments, first winding 516 and second winding 518 have a different number of turns and/or a different inductance to facilitate the features described herein. In the first wiring configuration shown in FIG. 5, first winding 516 and second winding 518 are energized in parallel of each other at the first operating voltage. In the second wiring configuration shown in FIG. 6, first winding 516 and second winding 518 are energized in series at a second operating voltage. The second operating voltage is greater than the first operating voltage, however the use of first and second windings 516, 518 enables the use of multiple operating voltages without substantially affecting performance of motor 106. That is, the same number of windings (two) is energized for each operating voltage.

In the exemplary embodiment, first and second windings 516, 518 are coupled together at a center terminal CA'. During normal operation of motor 106, protector 512 is configured to operate as a short circuit (i.e., substantially no impedance). Accordingly, the terminal CA is equivalent to the center terminal CA' during normal operation of motor 106. The terminal CA is coupled to control circuit 108 (shown in FIG. 3) in the first wiring configuration. The terminal CA is configured to be energized by control circuit 108 to produce a high motor speed. In the second wiring configuration, the terminal CA is coupled to the terminal CA to connect first and second windings 516, 518 in series.

Extended sets of main windings 508, 510 are configured to be energized with set of main windings 506 to produce a plurality of motor speeds. In the exemplary embodiment, set of main windings 506 and extended sets of main windings 508, 510 are configured to be energized to produce a high motor speed, a medium motor speed, and a low motor speed. The motor speeds are 'high', 'medium', and 'low' with respect to each other. In other embodiments, motor 106 may include a different number of extended main windings to facilitate a different number of motor speeds. For each motor speed, at least two windings of main windings 506 and extended main windings 508, 510 are energized to prevent performance drops at low speeds from energizing a single winding. Similar to main winding 506, extended main windings 508, 510 include multiple windings or winding portions to facilitate substantially the same performance for each motor speed and operating voltage.

In the exemplary embodiment, first extended set of main windings 508 includes a center tap at the terminal C6 to enable first extended set of main windings 508 to be split into a first winding portion 520 and a second winding portion 522. First extended set of main windings 508 is centered tapped to reduce the number of individual windings coupled to stator 110 (shown in FIG. 1). In certain embodiments, manufacturing limitations (e.g., wiring size, motor size, space to operate manufacturing tools, etc.) prevent the number of windings in motor 106 exceeding a predefined number of windings. In one example, motor 106 may be limited to six windings (including start winding 502). Second extended set of main windings 510 includes a first winding 524 and a second winding 526. Winding portions 520, 522 and/or windings 524, 526 have any suitable number of turns and inductance that facilitate motor 106 functioning as described herein. Similar to windings 516, 518 of main winding 506, extended sets of main windings 508, 510 are configured to be energized in parallel in the first wiring configuration at the first operating voltage and are configured to be energized in series in the second wiring configuration at the second operating voltage.

The terminal MA (sometimes referred to as the "source terminal") is configured to provide power from control circuit 108 in both the first and second wiring configurations. The terminal MC is configured to provide multiple wiring configurations for capacitor 504. In at least some embodiments, capacitor 504 is positioned outside of a housing of motor 106. The terminal MC enables capacitor 504 to be coupled to the terminal MA via an internal connection within the housing of motor 106. Alternatively, capacitor 504 may be directly coupled to the terminal MA without the lead coupled to the terminal MC. With respect to FIGS. 3 and 5, in the first wiring configuration, the terminal CB is coupled to control circuit 108. The terminals CC and CD are coupled together to electrically couple windings 516 and 518 together. The terminals CA, C1, C2, C3, C4, C5, C6, and C7 are coupled to control circuit 108. The terminals CA, C1, and C5 are associated with the high motor speed. That is, in the first wiring configuration, control circuit 108 energizes the terminals CA, C1, and C5 to cause rotor 112 to rotate at the high motor speed. The terminals C2, C3, and C6 are associated with the medium motor speed. Similarly, the terminals C4 and C7 are associated with the low motor speed.

With respect to FIGS. 4 and 6, in the second wiring configuration, terminal CA is coupled to the terminal CB to electrically couple windings 516, 518 in series with each other. The terminal C2 is coupled to the terminal C5 to connect first winding portion 520 and first winding 524. The terminal C3 is coupled to the terminal C7 to connect second winding portion 522 and second winding 526. The terminals CC, C1, C4, and C6 are coupled to control circuit 108. The terminals CC and C1 are associated with the high motor speed, the terminal C6 is associated with the medium motor speed, and the terminal C4 is associated with the low motor speed.

Protector 512 is coupled to the terminal CA in both wiring configurations. In the exemplary embodiment, protector 512 is configured to electrically disconnect at least a portion of main winding 506 in response to an overcurrent condition. As used herein, an overcurrent condition includes electric current or a temperature over a predetermined threshold that may cause damage to motor 106. Protector 512 is configured to monitor the current or temperature at the terminal CA and disconnect when the predetermined threshold is exceeded. Protector 512 may be, but is not limited to, a spark gap, a switch, a circuit breaker, a fuse, and the like. In some embodiments, stator 110 may include additional protectors 512. In one example, stator 110 includes three protectors 512, each protector 512 associated with a particular motor speed.

With respect again to FIGS. 3-6, in the exemplary embodiment, wiring interface 114 is configured to enable an installer in the field to switch between the first and second wiring configurations. Wiring interface 114 includes a first subset of wiring leads associated with the first operating voltage and the first wiring configuration. Wiring interface 114 also includes a second subset of wiring leads associated with the second operating voltage and the second wiring configuration. In at least some embodiments, the first and second subset of wiring leads may at least partially overlap such that at least some leads 306 are part of both subsets. In certain embodiments, at least some terminals are coupled to separate wiring leads 306 for the first and second subsets of wiring nodes. In such embodiments, the first and second subsets may extend from motor 106 in two physical locations spaced apart from each other such that the installer can distinguish between the first and second subsets.

In the exemplary embodiment, with respect to FIG. 1, during a field installation of system 100 or installation of motor 106 in a previously installed system 100, the installer determines an operating voltage for motor 106. In one example, the installer determines the operating voltage based on a measured voltage or a predetermined voltage of a utility power grid coupled to system 100. After determining the operating voltage, the installer couples control circuit 108 to motor 106 using wiring interface 114 in the first or second wiring configurations. In one embodiment, if motor 106 is coupled to control circuit 108 prior to installation, wiring interface 114 may be in the second wiring configuration by default to reduce the risk of overcurrent conditions. At least some previous PSC motors are designed for a single operating voltage, and therefore the installer must maintain stock of multiple motors in different configurations to be prepared for different installation environments. However, motor 106 is configured to provide flexibility in stock and installation by operating at different voltages and having a plurality of motor speeds. Accordingly, the installer may reduce his or her stock of different motor configurations without reducing installation flexibility.

In at least some embodiments, to aid the installers with performing installation of motor 106, one or more installation guides may be added to motor 106 that the installer may refer to while coupling motor 106 to control circuit 108. FIG. 7 is an exemplary installation guide 700 that may be used in system 100. In the exemplary embodiment, guide 700 is coupled to or integrated with motor 106 such that the installer can refer to guide 700 without additional materials (e.g., manuals, instruction pamphlets, etc.). In one example, guide 700 is a wiring instruction label coupled to motor 106. In other embodiments, guide 700 may be separate from motor 106.

Guide 700 instructs the installer how to couple terminals (MA-C7) to control circuit 108 (shown in FIG. 1) in the first and the second wiring configurations. In particular, guide 700 provides instructions for each terminal of stator 110 (shown in FIG. 1) to insulate, couple to another terminal, or couple to a wiring harness of control circuit 108 (i.e., "LINE 1", "HIGH SPEED", "MEDIUM SPEED", "LOW SPEED"). In the exemplary embodiment, the first voltage is 115V, which is shown on the right side of guide 700. The second voltage is 208-230V, which is shown in the left side of guide 700. In addition, guide 700 instructs the installer on how to couple the rotation terminals to main winding 506 (shown in FIGS. 5 and 6) to set the rotation of rotor 112 (shown in FIG. 1) to a clockwise direction or a counter-clockwise direction.

Figure 8:
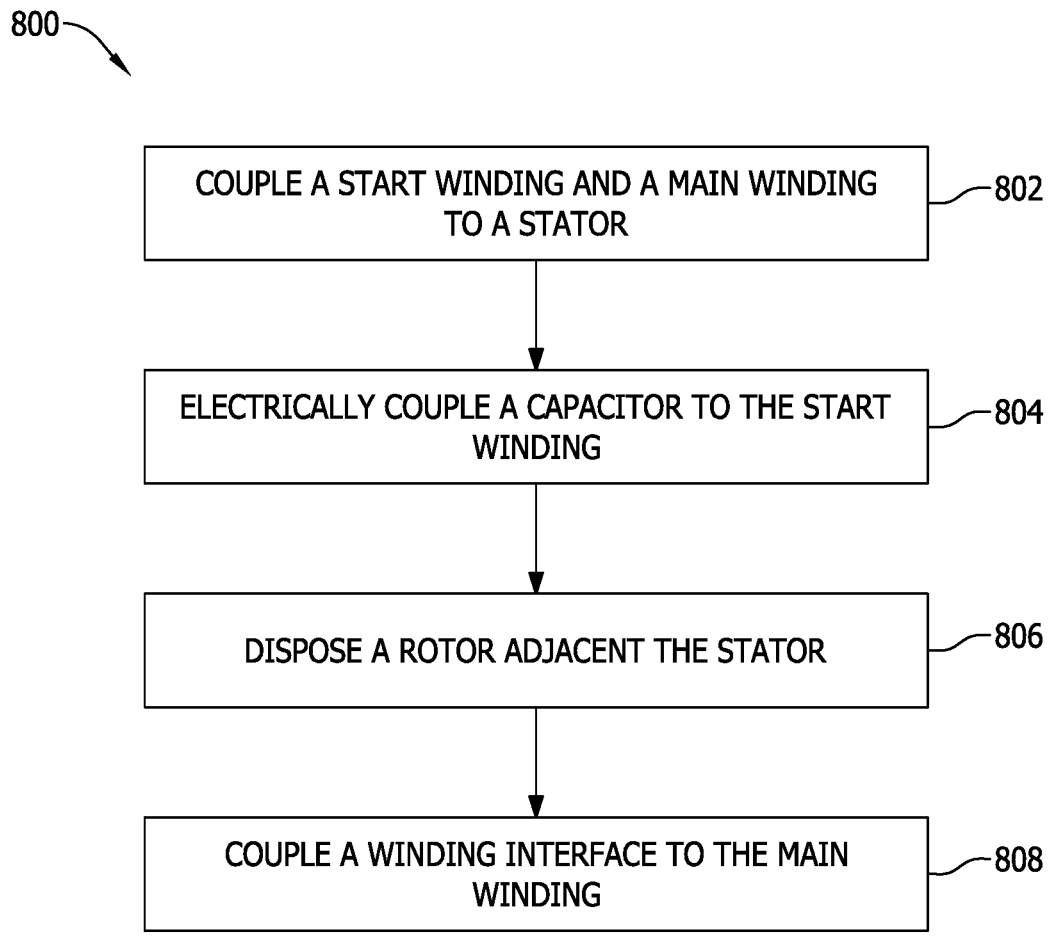
FIG. 8 is a flow diagram of an exemplary method for assembling a PSC motor for use in the system shown in FIG. 1.

FIG. 8 is a flow diagram of an exemplary method 800 for assembling a PSC motor that may be used with system 100 (shown in FIG. 1). Method 800 may be performed for other motor-based systems, such as pumps. In other embodiments, method 800 includes additional, fewer, or alternative steps, including those described elsewhere herein.

Method 800 begins with coupling 802 a start winding and a main winding (i.e., a set of main windings) to a stator. In some embodiments, stator includes a plurality of teeth that are configured to receive the start and main windings. The extended sets of main windings are also coupled to the stator to facilitate producing motor speeds. In the exemplary embodiment, the start winding is coupled to the stator in parallel to the main winding. A capacitor is electrically coupled 804 to the start winding in series. A rotor is disposed 806 adjacent the stator to facilitate the rotor rotating relative to the stator at a selectable one of a first motor speed and a second motor speed induced by a magnetic output of the start and main windings. A wiring interface is coupled 808 to the main winding and the extended sets of main windings to facilitate coupling the main winding and extended sets of main windings to a control circuit. In the example embodiment, the wiring interface is configured to be coupled to the control circuit in a first wiring configuration associated with a first operating voltage and a second wiring configuration associated with a second operating voltage. The wiring interface is configured to enable the control circuit to select a motor speed by selectively energizing the main and extended sets of main windings via the wiring interface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A permanent split capacitor (PSC) motor comprising:
   a stator defining an axis of rotation, said stator comprising:
      a start winding;
      a capacitor electrically coupled in series with said start winding;
      a first plurality of windings; and
      a second plurality of windings electrically coupled to said first plurality of windings, wherein at least one winding of said first plurality of windings is configured to be energized in parallel with at least one winding of said second plurality of windings at a first voltage and configured to be energized in series with the at least one winding of said second plurality of windings at a second voltage, wherein said second voltage is greater than said first voltage, wherein said first plurality of windings and said second plurality of windings are configured to be energized to produce a plurality of motor speeds; and
   a rotor disposed adjacent said stator and configured to rotate relative to said stator about the axis of rotation at a selected one of the plurality of motor speeds induced at least partially by a magnetic output of said start winding, said first plurality of windings, and said second plurality of windings.

2. A PSC motor in accordance with claim 1, wherein the first voltage is between 105 volts (V) and 125 V, inclusively, and wherein the second voltage is between 195 V and 245 V, inclusively.

3. A PSC motor in accordance with claim 1, wherein said stator comprises a main winding and two extended main windings including said first plurality of windings and said second plurality of windings, said main winding and said two extended main windings configured to produce the plurality of motor speeds, including a first motor speed, a second motor speed, and a third motor speed.

4. A PSC motor in accordance with claim 3, wherein a first extended main winding of said two extended main windings comprises a center terminal.

5. A PSC motor in accordance with Claim 1 further comprising a plurality of wiring leads electrically coupled to said start winding and said main winding, the plurality of wiring leads configured to be coupled to a control circuit in a selectable one of a first wiring configuration associated with the first voltage and a second wiring configuration associated with the second voltage.

6. A PSC motor in accordance with claim 5 further comprising an installation guide configured to provide instructions to couple the plurality of wiring leads in the first wiring configuration and the second wiring configuration, wherein said installation guide is one of integrated with said PSC motor and separate from said PSC motor.

7. A PSC motor in accordance with claim 5, wherein said plurality of wiring leads comprises:
   four wiring leads associated with a first motor speed of the plurality of motor speeds;
   three wiring leads associated with a second motor speed of the plurality of motor speeds;
   three wiring leads associated with a third motor speed of the plurality of motor speeds; and
   a wiring lead coupled to said capacitor.

8. A PSC motor in accordance with claim 5, wherein said stator comprises a plurality of rotation terminals, wherein a first subset of said plurality of wiring leads is coupled to said plurality of rotation terminals in one of a clockwise configuration and a counter-clockwise configuration, wherein said rotor is configured to be rotated in a clockwise direction when said first subset is coupled in a clockwise configuration and configured to be rotated in a counter-clockwise configuration when said first subset is coupled in a counter-clockwise configuration.

9. A permanent split capacitor (PSC) motor comprising:
   a stator defining an axis of rotation, said stator comprising:
      a start winding;
      a capacitor electrically coupled in series with said start winding;
      a plurality of main windings electrically coupled to said start winding and said capacitor, said plurality of main windings comprising a first center terminal; and
      a first plurality of extended main windings comprising a second center terminal, wherein said plurality of main windings and said first plurality of extended main windings are configured to be energized at one of a first voltage and a second voltage to produce a first motor speed and a second motor speed, wherein said second voltage is greater than said first voltage; and
   a rotor disposed adjacent said stator and configured to rotate relative to said stator about the axis of rotation at a selected one of the first motor speed and the second motor speed induced at least partially by a magnetic output of said start winding, said plurality of main windings, and said first plurality of extended main windings.

10. A PSC motor in accordance with claim 9, wherein said stator further comprises a second plurality of extended main windings, wherein said plurality of main windings, said first plurality of extended main windings, and said second plurality of extended main windings are configured to be energized to provide the first motor speed, the second motor speed, and a third motor speed.

11. A PSC motor in accordance with claim 9, wherein said plurality of main windings comprises a first winding and a second winding coupled to said first winding at said first center terminal, wherein said first winding and said second winding are configured to be energized in parallel at the first voltage via the first center terminal and are configured to be energized in series at the second voltage.

12. A PSC motor in accordance with claim 9 further comprising a plurality of wiring leads coupled to said start winding, said plurality of main windings, and said first plurality of extended main windings, said plurality of wiring leads configured to be coupled to a control circuit in a first wiring configuration associated with the first voltage and a second wiring configuration associated with the second voltage for energizing said stator.

13. A PSC motor in accordance with claim 12 further comprising a housing defining an internal chamber, said stator and said rotor at least partially disposed within the internal chamber, wherein said housing comprises an installation guide configured to provide instructions to couple said plurality of wiring leads to the control circuit in the first wiring configuration and the second wiring configuration.

14. A PSC motor in accordance with claim 13, wherein said housing defines a first lead exit and a second lead exit, wherein said plurality of wiring leads includes a first subset of wiring leads associated with the first wiring configuration that extends through the first lead exit and a second subset of wiring leads associated with the second wiring configuration that extends through the second lead exit.

15. A PSC motor in accordance with claim 12, wherein each of said plurality of wiring leads includes an insulation layer having a radial height less than $1/16$ inches.

16. A PSC motor in accordance with claim 12, wherein said plurality of wiring leads comprises:
    four wiring leads associated with a first motor speed of the plurality of motor speeds;
    three wiring leads associated with a second motor speed of the plurality of motor speeds;
    three wiring leads associated with a third motor speed of the plurality of motor speeds; and
    a wiring lead coupled to said capacitor.

17. A PSC motor in accordance with claim 9, wherein said stator further comprises a protector coupled to said first center terminal, said protector configured to electrically disconnect said main winding when an overcurrent condition occurs.

18. A heating, ventilation, and air conditioning (HVAC) system comprising:
    an air blower; and
    a permanent split capacitor (PSC) motor coupled to said air blower, said PSC motor comprising:
        a stator defining an axis of rotation, said stator comprising:
            a start winding;
            a capacitor electrically coupled in series with said start winding;
            a plurality of main windings electrically coupled to said start winding and said capacitor, said plurality of main windings comprising a first center terminal; and
            a first plurality of extended main windings comprising a second center terminal, wherein said plurality of main windings and said first plurality of extended main windings are configured to be energized at one of a first voltage and a second voltage to produce a first motor speed and a second motor speed, wherein said second voltage is greater than said first voltage; and
        a rotor disposed adjacent said stator and configured to rotate relative to said stator about the axis of rotation at a selected one of the first motor speed and the second motor speed induced at least partially by a magnetic output of said start winding, said plurality of main windings, and said first plurality of extended main windings.

19. An HVAC system in accordance with claim 18 further comprising a control circuit electrically coupled to said stator in a selectable one of a first wiring configuration and a second wiring configuration, wherein said control circuit is configured to energize said stator at the first voltage when coupled in the first wiring configuration and configured to energize said stator at the second voltage when coupled in the second wiring configuration.

20. An HVAC system in accordance with claim 18, wherein said stator further comprises a second plurality of extended main windings, wherein said plurality of main windings, said first plurality of extended main windings, and said second plurality of extended main windings are configured to be energized to provide the first motor speed, the second motor speed, and a third motor speed.

* * * * *